US012672105B2

(12) United States Patent
Garuda et al.

(10) Patent No.: US 12,672,105 B2
(45) Date of Patent: Jun. 30, 2026

(54) CONTEXT BASED PAGING OPTIMIZATION CONFIGURATION FOR RAN NODES USING xApp/rApp

(71) Applicant: Parallel Wireless, Inc., Nashua, NH (US)

(72) Inventors: Gajanana Garuda, Bangalore (IN); Amit Ghadge, Pune (IN)

(73) Assignee: Parallel Wireless, Inc., Nashua, NH (US)

( * ) Notice: Subject to any disclaimer, the term of this patent is extended or adjusted under 35 U.S.C. 154(b) by 233 days.

(21) Appl. No.: 18/349,854

(22) Filed: Jul. 10, 2023

(65) Prior Publication Data

US 2024/0196370 A1 Jun. 13, 2024

Related U.S. Application Data

(60) Provisional application No. 63/359,220, filed on Jul. 8, 2022.

(51) Int. Cl.
| | |
|---|---|
| *H04W 52/02* | (2009.01) |
| *H04W 68/00* | (2009.01) |
| *H04W 68/02* | (2009.01) |
| *H04W 68/12* | (2009.01) |

(52) U.S. Cl.
CPC ................................... *H04W 68/02* (2013.01)

(58) Field of Classification Search
CPC ............................ H04W 68/02; H04W 68/025

USPC ......................................................... 455/458
See application file for complete search history.

(56) References Cited

U.S. PATENT DOCUMENTS

| | | | |
|---|---|---|---|
| 12,526,701 B2 | 1/2026 | Bunde et al. | |
| 2014/0370922 A1* | 12/2014 | Richards ............... | H04W 68/02 |
| | | | 455/458 |
| 2015/0365916 A1* | 12/2015 | Wang ................... | H04B 7/2678 |
| | | | 370/329 |
| 2017/0201963 A1* | 7/2017 | Zhang .................. | H04W 76/28 |
| 2018/0007660 A1* | 1/2018 | Gao ...................... | H04W 68/02 |

OTHER PUBLICATIONS

IP.com search history (Year: 2025).*

\* cited by examiner

*Primary Examiner* — Moustapha Diaby

(74) *Attorney, Agent, or Firm* — Michael Y. Saji; Ashish Patel

(57) ABSTRACT

A method for optimizing parameters affecting Paging Optimization is disclosed, comprising: determining a first paging stage timeout value based on at least one of how much congested is the radio network, and whether paging from a same sub from a same location but paging optimization had already moved to a second stage; determining a second paging stage timeout value based on receiving retransmissions from core network for the same sub within this time; and how many times the subscribers respond later after the timer expiry; and applying a function to the paging cache timeout value, the first paging stage timeout value; and the second first paging stage timeout value to obtain a paging optimization value.

20 Claims, 5 Drawing Sheets

200

CONTEXT BASED PAGING OPTIMIZATION CONFIGURATION FOR RAN NODES USING xApp/rApp

CROSS-REFERENCE TO RELATED APPLICATIONS

The present application claims priority under 35 U.S.C. § 119(e) to U.S. Provisional Pat. App. No. 63/359,220, filed Jul. 8, 2022 and hereby incorporated by reference in its entirety for all purposes. As well, the present application hereby incorporates by reference, for all purposes, each of the following U.S. Patent Application Publications in their entirety: US20170013513A1; US20170026845A1; US20170055186A1; US20170070436A1; US20170077979A1; US20170019375A1; US20170111482A1; US20170048710A1; US20170127409A1; US20170064621A1; US20170202006A1; US20170238278A1; US20170171828A1; US20170181119A1; US20170273134A1; US20170272330A1; US20170208560A1; US20170288813A1; US20170295510A1; US20170303163A1; and US20170257133A1. This application also hereby incorporates by reference U.S. Pat. No. 8,879,416, "Heterogeneous Mesh Network and Multi-RAT Node Used Therein," filed May 8, 2013; U.S. Pat. No. 9,113,352, "Heterogeneous Self-Organizing Network for Access and Backhaul," filed Sep. 12, 2013; U.S. Pat. No. 8,867,418, "Methods of Incorporating an Ad Hoc Cellular Network Into a Fixed Cellular Network," filed Feb. 18, 2014; U.S. patent application Ser. No. 14/034,915, "Dynamic Multi-Access Wireless Network Virtualization," filed Sep. 24, 2013; U.S. patent application Ser. No. 14/289,821, "Method of Connecting Security Gateway to Mesh Network," filed May 29, 2014; U.S. patent application Ser. No. 14/500,989, "Adjusting Transmit Power Across a Network," filed Sep. 29, 2014; U.S. patent application Ser. No. 14/506,587, "Multicast and Broadcast Services Over a Mesh Network," filed Oct. 3, 2014; U.S. patent application Ser. No. 14/510,074, "Parameter Optimization and Event Prediction Based on Cell Heuristics," filed Oct. 8, 2014, U.S. patent application Ser. No. 14/642,544, "Federated X2 Gateway," filed Mar. 9, 2015, and U.S. patent application Ser. No. 14/936,267, "Self-Calibrating and Self-Adjusting Network," filed Nov. 9, 2015; U.S. patent application Ser. No. 15/607,425, "End-to-End Prioritization for Mobile Base Station," filed May 26, 2017; U.S. patent application Ser. No. 15/803,737, "Traffic Shaping and End-to-End Prioritization," filed Nov. 27, 2017, each in its entirety for all purposes, US02, US03, 71710US01, 71721US01, 71729US01, 71730US01, 71731US01, 71756US01, 71775US01, 71865US01, and 71866US01, respectively. This document also hereby incorporates by reference U.S. Pat. Nos. 9,107,092, 8,867,418, and 9,232, 547 in their entirety. This document also hereby incorporates by reference U.S. patent application Ser. No. 14/822,839, U.S. patent application Ser. No. 15/828,427, U.S. Pat. App. Pub. Nos. US20170273134A1, US20170127409A1 in their entirety.

BACKGROUND

Open Radio Access Network (Open RAN) is a movement in wireless telecommunications to disaggregate hardware and software and to create open interfaces between them. Open RAN also disaggregates RAN from into components like RRH (Remote Radio Head), DU (Distributed Unit), CU (Centralized Unit), Near-RT (Real-Time) and Non-RT (Real-Time) RIC (RAN Intelligence Controller). Open RAN has published specifications for the 4G and 5G radio access technologies (RATs).

In today's telecom networks Core Nodes maintain the UE context with permanent identifiers like SUPI & IMSI. And Access nodes maintain the UE context dynamically with identifiers like STMSI, RNTI etc. The contexts at Access nodes are temporary and exist till the node is handling the UE connectivity. As soon as the UE moves to other Access Nodes this context is deleted. Hence for Policy enforcement and related operations the responsibility lies on the Core Nodes and the Access Nodes just provide with the needed updates (e.g. location) to the Core Nodes. This is also done keeping in mind security of the User.

With the advent of ORAN and 5G there are many use cases that need the dynamic data of UE to calculate UE mobility and other parameters so that related policies can be enforced. Tasking Core Nodes for these operations will add to the overhead of processing and subsequent delays. Since ORAN RIC will be a centralized entity in the Access, apt solution will be to have a semi-permanent UE context in ORAN RIC that can use the dynamic data of UE collected from Access Nodes (O-CU/O-DU, O-ENB) and enforce related policies.

In 2G and 3G, the mobile architectures had controllers that were responsible for RAN orchestration and management. With 4G, overall network architecture became simplified and the expectation was that, to enable optimal subscriber experience, base stations would use the X2 interface to communicate with each other to handle resource allocation.

In mobile communication technology, the paging is an important feature but at the same time it can lead to signaling overheads. The paging performance and optimization is critical for network performance. There are many paging optimization techniques such as heuristic paging, TAC reconfigurations and others that exist today.

SUMMARY

A solution is proposed to implement a mechanism to optimize paging for different scenarios and various deployment use-cases which can potentially reduce the overall radio resource usage, which is critical for any mobile networks. The solution proposed here are mainly for 4G at the moment and can be expanded to 2G, 3G and 5G as well.

In one embodiment, a method of optimizing parameters affecting Paging Optimization, includes determining a paging cache timeout value based on at least one of a mobility of the subscriber, a Global Unique Temporary Identifier (GUTI) changing frequency for the subscriber triggered by core network; a paging cache hit frequency; and a time of day based on subscriber pattern; determining a first paging stage timeout value based on at least one of how much congested is the radio network; and whether paging from a same sub from a same location but paging optimization had already moved to a second stage; determining a second paging stage timeout value based on receiving retransmissions from core network for the same sub within this time; and how many times the subscribers respond later after the timer expiry; and applying a function to the paging cache timeout value, the first paging stage timeout value; and the second first paging stage timeout value to obtain a paging optimization value.

DETAILED DESCRIPTION

Figure 2:
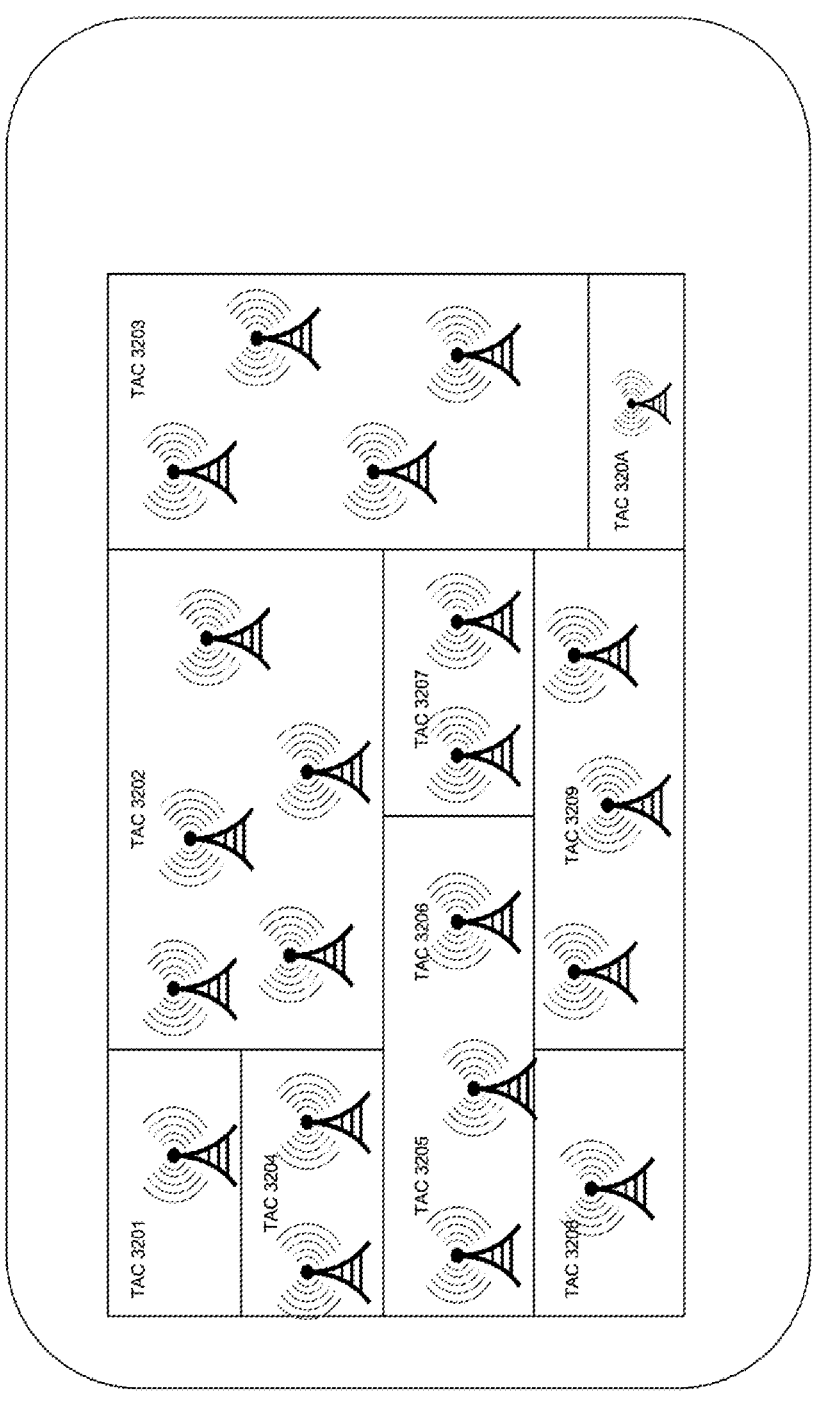
FIG. 2 is a schematic diagram of TAC configuration in the prior art.

FIG. 2 shows how the Tracking Area Codes (TACs) are configured mostly statically, and the heuristics paging will be performed based on the alignment of the TACs, in the prior art. In case of heuristics paging, paging is done in multiple stages. Paging is tried with the last known location, then paging is tried with TAI list, and finally paging is broadcasted to all the TAIs.

Problem

The eNodeB performs paging optimization so as to save amount of paging on the radio network. In summary, it remembers the last known location/cell of the subscriber and tries to page that location/cell first. If it doesn't get response then the neighboring cells are paged. Even then if there is no response then it tries to page all the cells of that tracking area(s), which is what the core network had intended to page. This is the common paging optimization mechanism that is being used in industry.

The efficiency of the above method depends on lot on the deployment scenarios such as urban, semi-urban, rural, near highway, near malls, railway stations, airports etc. There are some key parameters that will have major impact on the paging performances.
Paging Cache Timeout
  Paging Stage-1 Timeout
  Paging Stage-2 Timeout
The above parameters shall vary based on the deployment scenarios and the use cases. In the current deployments, most of these parameters are operator configurable and may not solve all the deployments in general. Operators need a way to control these parameters based on learning from the network performance, type of the deployments and also from paging KPIs.

Solution to Problem

Figure 1:
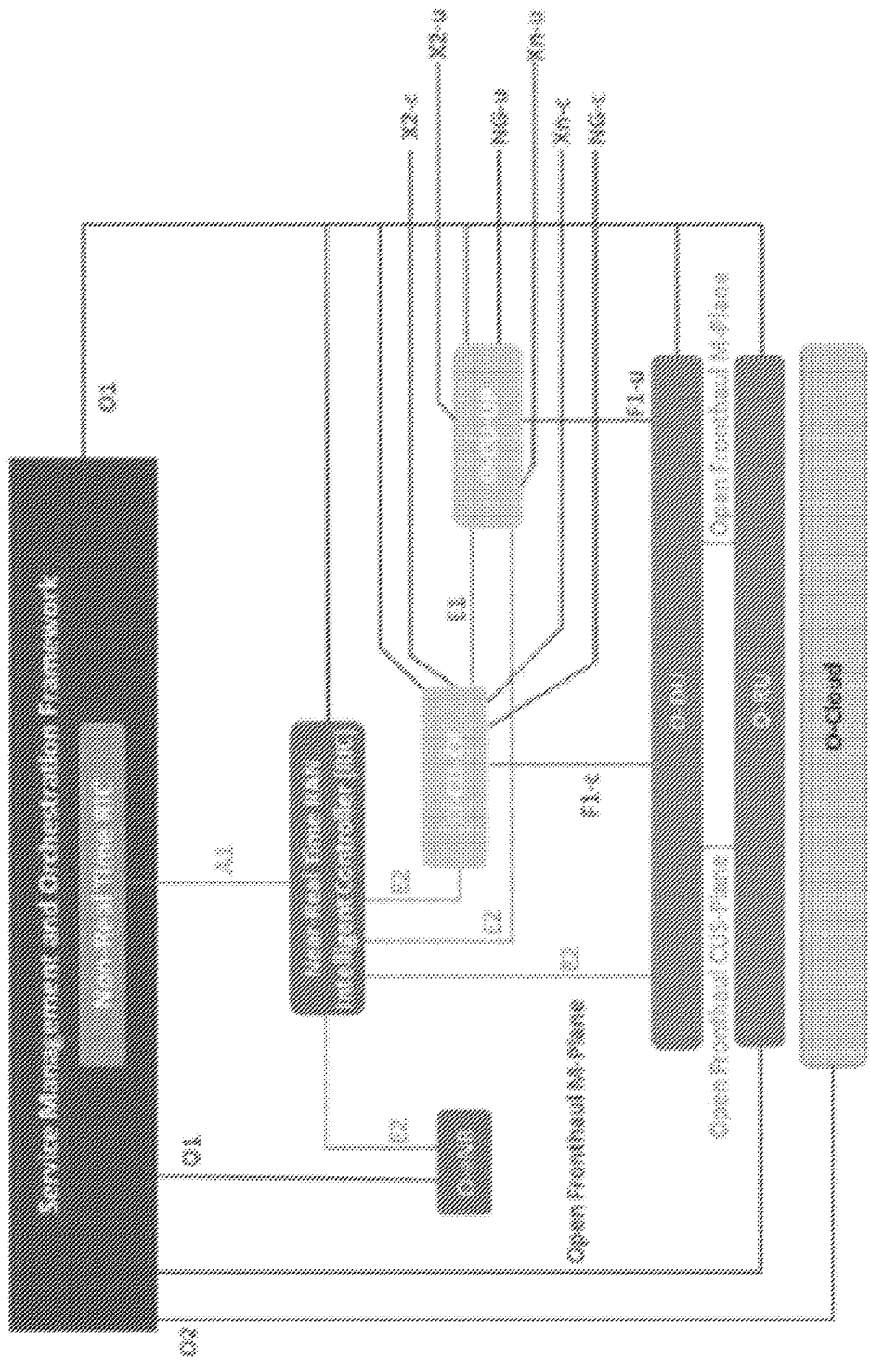
FIG. 1 is a schematic diagram of an Open RAN 4G/5G deployment architecture, as known in the prior art.

FIG. 1 shows OpenRAN, in accordance with some embodiments. Open RAN is the movement in wireless telecommunications to disaggregate hardware and software and to create open interfaces between them. Open RAN also disaggregates RAN into components like RRH (Remote Radio Head), DU (Distributed Unit), CU (Centralized Unit), Near-RT (Real-Time) and Non-RT (Real-Time) RIC(RAN Intelligence Controller).

Figure 4:
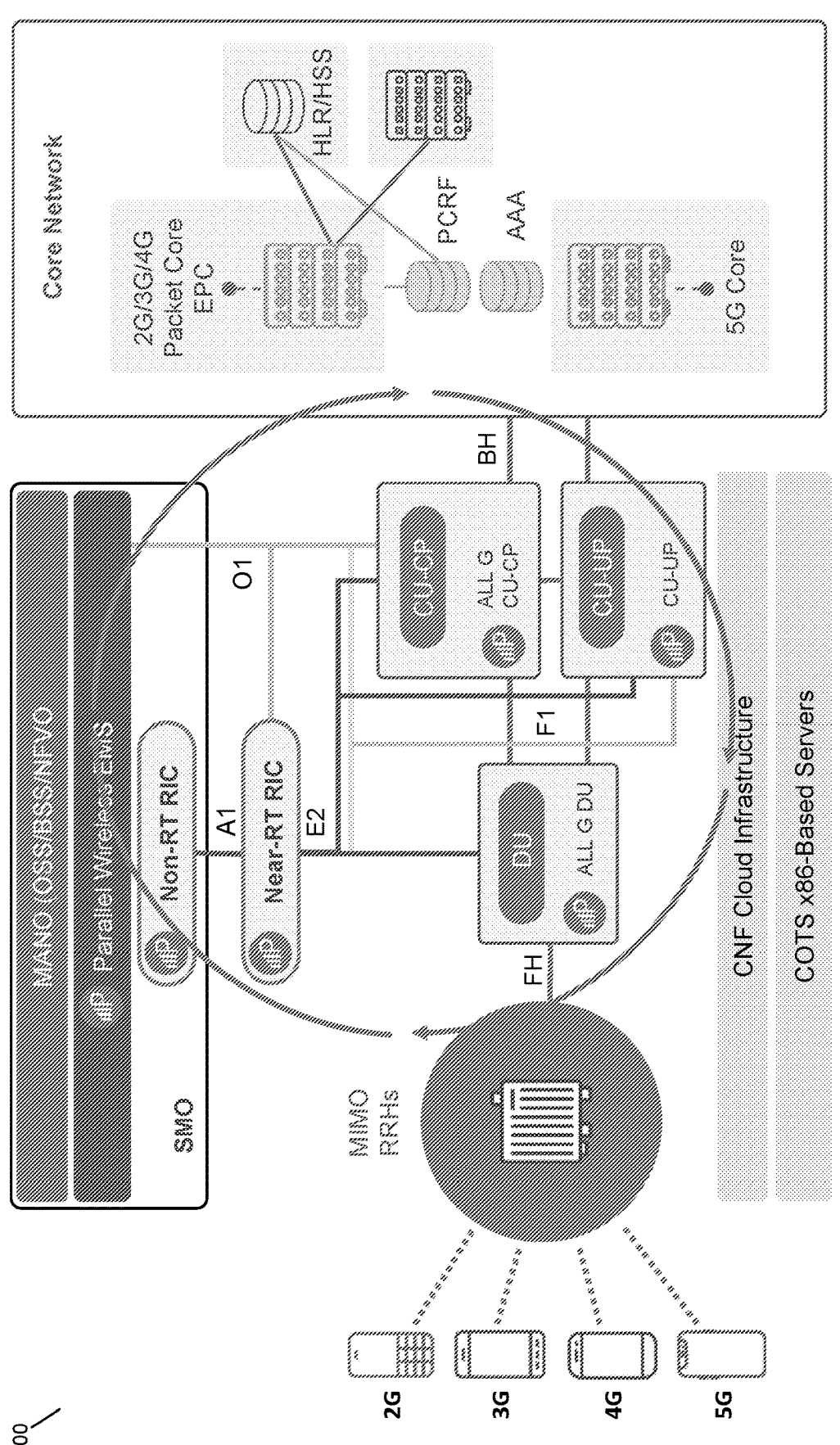
FIG. 4 is a schematic diagram of a multi-RAT RAN deployment architecture, in accordance with some embodiments.
Figure 5:
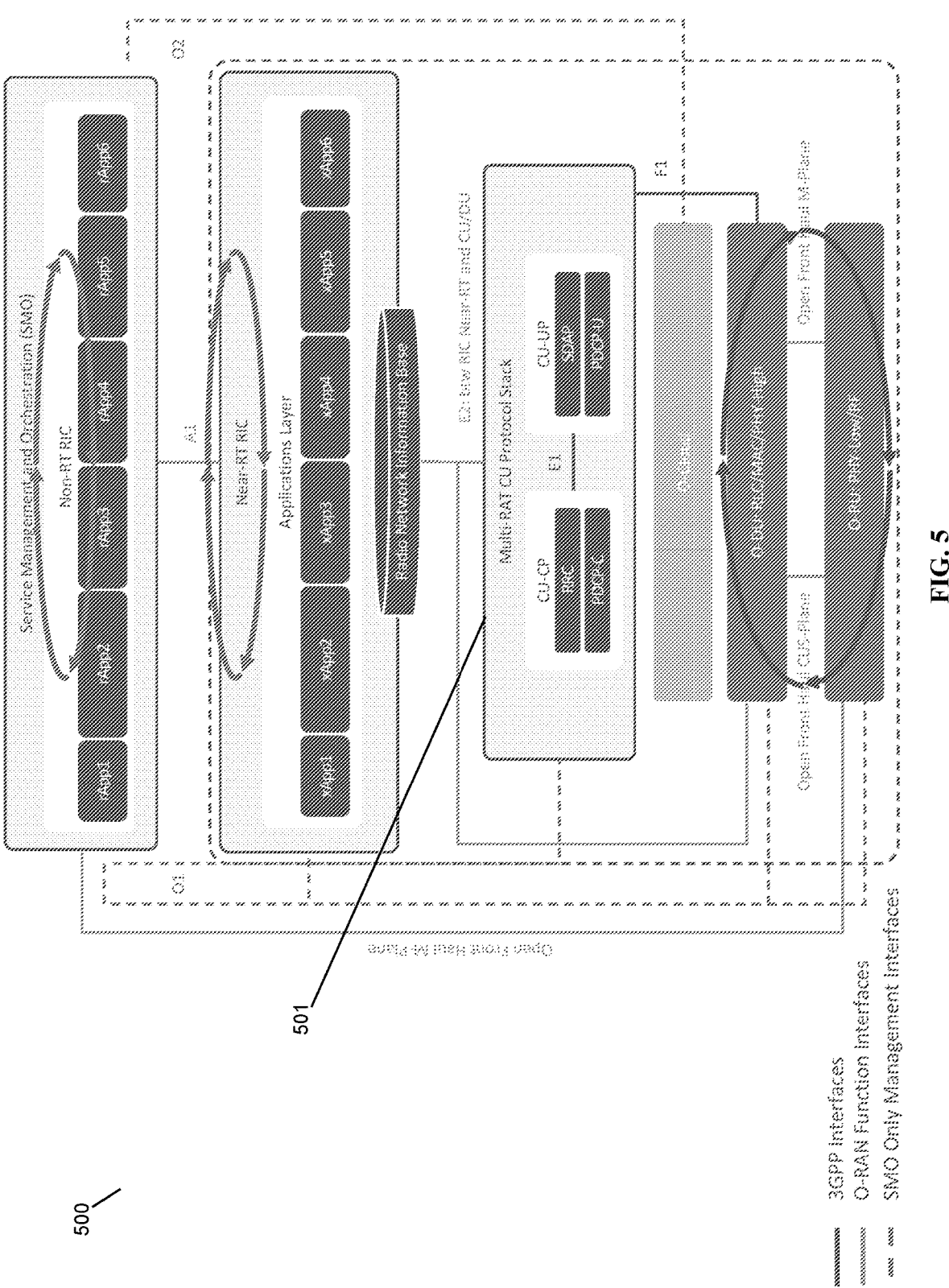
FIG. 5 is an additional schematic diagram of a multi-RAT RAN deployment architecture, in accordance with some embodiments.

In some embodiments, a radio tower with a remote radio head (RRH) may support multiple RATs, 2G/3G/4G/5G, but without requiring four generations of radio base stations. Instead, one or more software-upgradable, remotely config- urable base stations is coupled to radio heads and filters that are able to operate on the appropriate frequencies for 2G, 3G, 4G, and 5G RATs. The multiple BBUs located at the bottom of the typical radio tower have been replaced with one or more vBBUs, virtual baseband units that are rearchi- tected to use modern virtualization technologies. FIG. 4 can be enabled using a technology like CPRI or eCPRI, which enables digitization and transfer of radio I/Q samples for further processing at a BBU or vBBU.

Where virtualization is described herein, one having skill in the cloud technology arts would understand that a variety of technologies could be used to provide virtualization, including one or more of the following: containers, Kuber- netes, Docker, hypervisors, virtual machines, hardware vir- tualization, microservices, AWS, Azure, etc. In a preferred embodiment, containerized microservices coordinated using Kubernetes are used to provide baseband processing for multiple RATs as deployed on the tower.

The inventors have appreciated that the use of the 3GPP model for functional splits is flexible and may be used to provide deployment flexibility for multiple RATs, not just 5G. Functional splits can be used in conjunction with cloud and virtualization technology to perform virtualization of, e.g., the RU, DU, and CU of not just 5G but also 4G, 3G, 2G, etc. This enables the use of commodity off-the-shelf servers, software-defined networking that can be rapidly upgraded remotely, and lower power requirements by using modern hardware compared to legacy hardware.

In some embodiments, a fronthaul link connects the RRH to a DU+CU, which runs a variety of virtualized RAT processing on a vBBU machine. The fronthaul link may be CPRI or eCPRI, or another similar interface. The DU+CU may be located at the base of the tower or at a further remove as enabled by different latency envelopes; typically this will be close to the tower for a 5G deployment. In some embodiments, a HetNet Gateway (HNG), which performs control and user plane data aggregation and gateway ser- vices, may be the next destination via the backhaul connec- tion; the HNG may disaggregate the different RAT commu- nications to be directed to different RAT cores (i.e., a 2G core, a 3G core, a 4G core, a 5G core and so on). In some embodiments and in certain situations, an HNG may per- form virtualization or interworking of aggregated commu- nications such that, e.g., 2G communications may be inter- worked to 4G IP voice communications and routed through the 4G core. In some embodiments, the HNG may perform virtualization of one or more cores such that the communi- cations may not need to terminate at a RAT-specific core; this feature may be combined with interworking in some embodiments. In some embodiments, no aggregator may be present and the vBBU may directly route communications to each RAT's individual core.

CU function is split into CU-CP (Control Plane) and CU-UP (User Plane) function to provide Control and User Plane separation. Open RAN solution supports: Open Inter- faces between different functions; Software based functions; Cloud Native functions; Intelligence support via support for xApps/rApps; 3rd Party RRHs; Disaggregated functions; White Box COTS hardware support; Data Path separated from Control plane traffic.

The O-RAN deployment architecture includes an O-DU (OpenRAN distributed unit) and O-RU (OpenRAN radio unit), which together comprise a 5G base station in the diagram as shown. The O-CU-CP (central unit control plane) and O-CU-UP (central unit user plane) are ORAN- aware 5G core network nodes. An ORAN-aware LTE node, O-eNB, is also shown. As well, a near-real time RAN intelligent controller is shown, in communication with the CU-UP, CU-CP, and DU, performing near-real time coordination As well, a non-real time RAN intelligent controller is shown, receiving inputs from throughout the network and specifically from the near-RT RIC and performing service management and orchestration (SMO), in coordination with the operator's network (not shown). In some embodiments 2G, 3G can be integrated. In some embodiments 2G/3G/4G DU or RU may be provided.

The Near-RT RIC hosts one or more xApps that use the E2 interface to collect near real-time information (on a UE basis or a cell basis). The Near-RT RIC control over the E2 nodes is steered via the policies and the data provided via A1 from the Non-RT RIC. The RRM functional allocation between the Near-RT RIC and the E2 node is subject to the capability of the E2 node and is controlled by the Near-RT RIC.

In some embodiments, context for the UE may be persisted across multiple near-RT RICs, as described in U.S. patent application Ser. No. 18/338,342, hereby incorporated by reference.

In some embodiments, the near-RT RIC may be an all-G near-RT RIC. The all-G near-RT RIC may perform processing and network adjustments that are appropriate given the RAT. For example, a 4G/5G near-RT RIC performs network adjustments that are intended to operate in the 100 ms latency window. However, for 2G or 3G, these windows may be extended. As well, the all-G near-RT RIC can perform configuration changes that takes into account different network conditions across multiple RATs. For example, if 4G is becoming crowded or if compute is becoming unavailable, admission control, load shedding, or UE RAT reselection may be performed to redirect 4G voice users to use 2G instead of 4G, thereby maintaining performance for users. As well, the non-RT RIC is also changed to be a near-RT RIC, such that the all-G non-RT RIC is capable of performing network adjustments and configuration changes for individual RATs or across RATs similar to the all-G near-RT RIC. In some embodiments, each RAT can be supported using processes, that may be deployed in threads, containers, virtual machines, etc., and that are dedicated to that specific RAT, and, multiple RATs may be supported by combining them on a single architecture or (physical or virtual) machine. In some embodiments, the interfaces between different RAT processes may be standardized such that different RATs can be coordinated with each other, which may involve interworking processes or which may involve supporting a subset of available commands for a RAT, in some embodiments. Where "all-G" is specified it is understood that various combinations of radio access technologies, or Gs, may be combined and that not all of 2G/3G/4G/5G/Wi-Fi are required to be present in each embodiment.

Also as shown in FIG. 1, with introduction of Near-RT-RIC and Non-RT-RIC, MME/HeNBGW can get the dynamic values for Paging Cache timeout and Paging Stage-1 and Stage-2 timeout values.

It introduces a mechanism for context aware parameter configuration by making use of Near-RT RIC and Non-RT RIC. RICs have access to network level data and configuration with access to EMS or Topology data, this needs to be leveraged to provide context based parameter configuration based on different scenarios and use cases. This mechanism can be used not just for Paging optimization but even for other such RAN features that need context-based configuration, or contexts for different RATs or multiple RATs.

An xApp and rApp named "PagingOpt-Cfg-xApp" and "PagingOpt-Cfg-rApp" respectively are proposed. These xApp and rApp hosted on Near-RT-RIC and Non-RT-RIC respectively determine the most appropriate value for those parameters by continuous real-time data collections from CU/DU (eNBs/gNBs) and also apply AI/ML algorithm at Non-RT-RIC and predict the more efficient value for these parameters.

Figure 3:
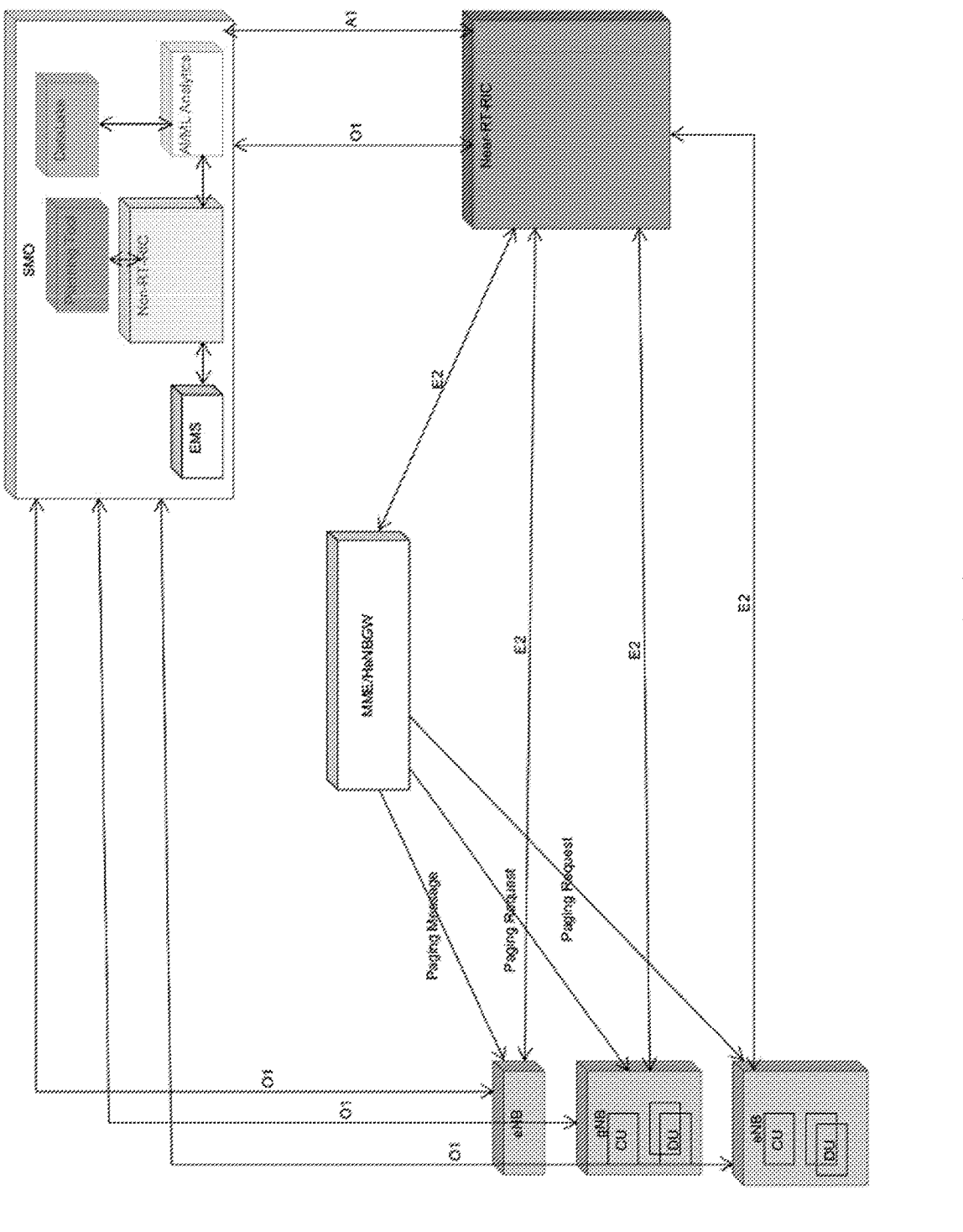
FIG. 3 is an architecture diagram in accordance with some embodiments.

FIG. 3 is an architecture diagram in accordance with some embodiments.

The parameters affecting Paging Optimization are, in some embodiments:

Paging Cache Timeout:—This value determines how long the subscriber information should be stored in paging cache and used for optimized paging. This value will depend on many factors listed below.

Mobility of the subscriber. How frequently the subscribers move. Let's call this factor as "m".

The GUTI changing frequency for the subscriber triggered by core network. Let's call this factor as "g".

The paging cache hit frequency. Let's call this as "c".

The time of day based on subscriber pattern. Let's call this as "t".

Paging Cache Timeout=Function (m, g, c, t)

Paging Stage-1 Timeout: how much longer to wait for subscriber to respond from old location or neighbors—Depends on:

How much congested is the radio network, call this as "cg".

DRX cycle: Whether we received paging from same sub from same location but paging optimization had already moved to stage-2. Let's call this as "s2".

Paging Stage-1 Timeout=Function (cg, s2)

Paging Stage-2 Timeout: how much longer to wait for subscriber to respond form the complete TAI—Depends on:

Are we receiving retransmissions from core NW for the same sub within this time? Let's call this as "cr".

how many times the subscribers respond later after the timer expiry? Let's call this as "sl".

Paging Stage-2 Timeout=Function (cr, sl)

The current heuristic paging used by many competitors in the prior art is very static in nature. It doesn't consider the dynamic nature of the network behavior, use cases and the type of the deployments. The generic approach is applied with same parameters value for all the cases.

The introduction of ORAN components such as Near-RT-RIC and Non-RT-RIC enables efficient way of finding the right values of attributes used in paging which will help in optimized paging with real-time data collection such as paging KPIs. This approach also enables operator to apply AI/ML algorithm which enabled automated learning from dynamic network conditions.

As this solution is based on the OpenRAN architecture, OpenRAN functions like RIC/CU/DU and interfaces like E2 & O1 are assumed and utilized, in some embodiments. Context-aware parameter configuration is added in the protocols and interfaces between network functions, in some embodiments.

In any of the scenarios described herein, where processing may be performed at the cell, the processing may also be performed in coordination with a cloud coordination server or at a central server or at a centralized unit (CU), a distributed unit (DU), a near-RT RIC, a non-RT RIC, or at one or more points between the radio head RF unit and the core network. A mesh node may be an eNodeB. An eNodeB may be in communication with the cloud coordination server via an X2 protocol connection, or another connection. The eNodeB may perform inter-cell coordination via the cloud communication server when other cells are in communication with the cloud coordination server. The eNodeB may communicate with the cloud coordination server to determine whether the UE has the ability to support a handover to Wi-Fi, e.g., in a heterogeneous network.

In some embodiments the present application may be located on the same physical device. In some embodiments, the present application may be embodied as a machine learning (ML) model, and the ML model may be deployed to the edge of the network, as shown by the arrow, in some embodiments to a near-RT RIC. In some embodiments the application may be trained and/or deployed at a non-RT RIC. In some embodiments the model may be trained once and deployed to multiple near-RT RICs. The near-RT RIC may take input from various KPIs as described herein and may further cause actions to be taken. In some embodiments the operation of the application may be an xApp, an rApp, or both. The rApp may communicate with a corresponding xApp at the non-RT RIC, in some embodiments, and vice versa. The corresponding xApp may communicate with a management operation in the core network, in some embodiments.

Although the methods above are described as separate embodiments, one of skill in the art would understand that it would be possible and desirable to combine several of the above methods into a single embodiment, or to combine disparate methods into a single embodiment. For example, all of the above methods could be combined. In the scenarios where multiple embodiments are described, the methods could be combined in sequential order, or in various orders, as necessary.

Although the above systems and methods for providing interference mitigation are described in reference to the Long Term Evolution (LTE) standard, one of skill in the art would understand that these systems and methods could be adapted for use with other wireless standards or versions thereof. The inventors have understood and appreciated that the present disclosure could be used in conjunction with various network architectures and technologies. Wherever a 4G technology is described, the inventors have understood that other RATs have similar equivalents, such as a gNodeB for 5G equivalent of eNB. Wherever an MME is described, the MME could be a 3G RNC or a 5G AMF/SMF. Additionally, wherever an MME is described, any other node in the core network could be managed in much the same way or in an equivalent or analogous way, for example, multiple connections to 4G EPC PGWs or SGWs, or any other node for any other RAT, could be periodically evaluated for health and otherwise monitored, and the other aspects of the present disclosure could be made to apply, in a way that would be understood by one having skill in the art.

Additionally, the inventors have understood and appreciated that it is advantageous to perform certain functions at a coordination server, such as the Parallel Wireless HetNet Gateway, which performs virtualization of the RAN towards the core and vice versa, so that the core functions may be statefully proxied through the coordination server to enable the RAN to have reduced complexity. Therefore, at least four scenarios are described: (1) the selection of an MME or core node at the base station; (2) the selection of an MME or core node at a coordinating server such as a virtual radio network controller gateway (VRNCGW); (3) the selection of an MME or core node at the base station that is connected to a 5G-capable core network (either a 5G core network in a 5G standalone configuration, or a 4G core network in 5G non-standalone configuration); (4) the selection of an MME or core node at a coordinating server that is connected to a 5G-capable core network (either 5G SA or NSA). In some embodiments, the core network RAT is obscured or virtualized towards the RAN such that the coordination server and not the base station is performing the functions described herein, e.g., the health management functions, to ensure that the RAN is always connected to an appropriate core network node. Different protocols other than SIAP, or the same protocol, could be used, in some embodiments.

In some embodiments, the base stations described herein may support Wi-Fi air interfaces, which may include one or more of IEEE 802.11a/b/g/n/ac/af/p/h. In some embodiments, the base stations described herein may support IEEE 802.16 (WiMAX), to LTE transmissions in unlicensed frequency bands (e.g., LTE-U, Licensed Access or LA-LTE), to LTE transmissions using dynamic spectrum access (DSA), to radio transceivers for ZigBee, Bluetooth, or other radio frequency protocols, or other air interfaces.

In some embodiments, the software needed for implementing the methods and procedures described herein may be implemented in a high level procedural or an object-oriented language such as C, C++, C#, Python, Java, or Perl. The software may also be implemented in assembly language if desired. Packet processing implemented in a network device can include any processing determined by the context. For example, packet processing may involve high-level data link control (HDLC) framing, header compression, and/or encryption. In some embodiments, software that, when executed, causes a device to perform the methods described herein may be stored on a computer-readable medium such as read-only memory (ROM), programmable-read-only memory (PROM), electrically erasable programmable-read-only memory (EEPROM), flash memory, or a magnetic disk that is readable by a general or special purpose-processing unit to perform the processes described in this document. The processors can include any microprocessor (single or multiple core), system on chip (SoC), microcontroller, digital signal processor (DSP), graphics processing unit (GPU), or any other integrated circuit capable of processing instructions such as an x86 microprocessor.

In some embodiments, the radio transceivers described herein may be base stations compatible with a Long Term Evolution (LTE) radio transmission protocol or air interface. The LTE-compatible base stations may be eNodeBs. In addition to supporting the LTE protocol, the base stations may also support other air interfaces, such as UMTS/HSPA, CDMA/CDMA2000, GSM/EDGE, GPRS, EVDO, 2G, 3G, 5G, TDD, or other air interfaces used for mobile telephony.

In some embodiments, the base stations described herein may support Wi-Fi air interfaces, which may include one or more of IEEE 802.11a/b/g/n/ac/af/p/h. In some embodiments, the base stations described herein may support IEEE 802.16 (WiMAX), to LTE transmissions in unlicensed frequency bands (e.g., LTE-U, Licensed Access or LA-LTE), to LTE transmissions using dynamic spectrum access (DSA), to radio transceivers for ZigBee, Bluetooth, or other radio frequency protocols, or other air interfaces.

The foregoing discussion discloses and describes merely exemplary embodiments of the present invention. In some embodiments, software that, when executed, causes a device to perform the methods described herein may be stored on a computer-readable medium such as a computer memory storage device, a hard disk, a flash drive, an optical disc, or the like. As will be understood by those skilled in the art, the present invention may be embodied in other specific forms without departing from the spirit or essential characteristics thereof. For example, wireless network topology can also apply to wired networks, optical networks, and the like. The methods may apply to LTE-compatible networks, to UMTS-compatible networks, or to networks for additional protocols that utilize radio frequency data transmission. Various components in the devices described herein may be added, removed, split across different devices, combined onto a single device, or substituted with those having the same or similar functionality.

Although the present disclosure has been described and illustrated in the foregoing example embodiments, it is understood that the present disclosure has been made only by way of example, and that numerous changes in the details of implementation of the disclosure may be made without departing from the spirit and scope of the disclosure, which is limited only by the claims which follow. Various components in the devices described herein may be added, removed, or substituted with those having the same or similar functionality. Various steps as described in the figures and specification may be added or removed from the processes described herein, and the steps described may be performed in an alternative order, consistent with the spirit of the invention. Features of one embodiment may be used in another embodiment.

The invention claimed is:

1. A method of improving paging in a radio network, comprising:
   collecting data, by a Radio Access Network (RAN) Intelligent Controller (RIC) of the radio network, from at least one of one or more OpenRAN (ORAN) centralized units (CUs) of the radio network and one or more ORAN distributed units (DUs) of the radio network;
   determining, by the RIC, at least one of a first paging stage timeout value,
   a second paging stage timeout value, and a paging cache timeout value based on the collected data; and
   causing adjusting by a network entity coupled to the RIC of one or more paging configuration parameter values based on the determined at least one of the first paging stage timeout value, the second paging stage timeout value and the paging cache timeout value.

2. The method of claim 1, wherein determining a paging cache timeout value includes determining the paging cache timeout value based on one or more of a mobility of a subscriber, a Global Unique Temporary Identifier (GUTI) changing frequency for the subscriber triggered by core network, a paging cache hit frequency, and a time of day based on a subscriber pattern.

3. The method of claim 1, wherein determining a first paging stage timeout value includes determining the first paging stage timeout value based on at least one of how congested the radio network is, and whether, during a paging process, a paging response from a same subscriber from a same location is received after the paging process already moved to a second paging stage.

4. The method of claim 1, wherein determining a second paging stage timeout value includes determining the second paging stage timeout value based on at least one of paging retransmissions from the network entity for a same subscriber during the second paging stage and how many times a subscriber responds to paging after timer expiry for the second paging stage.

5. The method of claim 1, wherein collecting data by a RIC includes at least one of collecting near-real time data by a near-real time RIC and collecting non-real time data by a non-real time RIC.

6. The method of claim 5, wherein determining at least one of a first paging stage timeout value, a second paging stage timeout value, and a paging cache timeout value based on the collected data includes determining, by at least one of an xApp and an rApp of the RIC, at least one of the first paging stage timeout value, the second paging stage timeout value, and the paging cache timeout value based on the collected data.

7. The method of claim 1, wherein causing adjusting by a network entity coupled to the RIC of one or more paging configuration parameter values based on the determined at least one of the first paging stage timeout value, the second paging stage timeout value and the paging cache timeout value includes transmitting by the RIC to the network entity one or more new paging configuration parameter values based on the determined at least one of the first paging stage timeout value, the second paging stage timeout value and the paging cache timeout value.

8. A system for improving paging in a radio network, comprising:
   a Radio Access Network (RAN) Intelligent Controller (RIC) of the radio network, including a memory and a processor, wherein the RIC is configured to:
      collect data from at least one of one or more OpenRAN (ORAN) centralized units (CUs) of the radio network and one or more ORAN distributed units (DUs) of the radio network;
      determine at least one of a first paging stage timeout value, a second paging stage timeout value, and a paging cache timeout value based on the collected data; and
      cause adjusting by a network entity coupled to the RIC of one or more paging configuration parameter values based on the determined at least one of the first paging stage timeout value, the second paging stage timeout value and the paging cache timeout value.

9. The system of claim 8, wherein determine a paging cache timeout value includes determine the paging cache timeout value based on one or more of a mobility of a subscriber, a Global Unique Temporary Identifier (GUTI) changing frequency for the subscriber triggered by core network, a paging cache hit frequency, and a time of day based on a subscriber pattern.

10. The system of claim 8, wherein determine a first paging stage timeout value includes determine the first paging stage timeout value based on at least one of how congested the radio network is, and whether, during a paging process, a paging response from a same subscriber from a same location is received after the paging process already moved to a second paging stage.

11. The system of claim 8, wherein determine a second paging stage timeout value includes determine the second paging stage timeout value based on at least one of paging retransmissions from the network entity for a same subscriber during the second paging stage and how many times a subscriber responds to paging after timer expiry for the second paging stage.

12. The system of claim 8, wherein:
   the RIC includes at least one of a near-real time RIC and a non-real time RIC; and
   collect data includes at least one of collect near-real time data by the near-real time RIC and collect non-real time data by the non-real time RIC.

13. The system of claim 12, wherein determine at least one of a first paging stage timeout value, a second paging stage timeout value, and a paging cache timeout value based on the collected data includes determine, by at least one of an xApp and an rApp of the RIC, at least one of the first paging stage timeout value, the second paging stage timeout value, and the paging cache timeout value based on the collected data.

14. The system of claim 8, wherein cause adjusting, by a network entity coupled to the RIC, of one or more paging configuration parameter values based on the determined at least one of the first paging stage timeout value, the second paging stage timeout value and the paging cache timeout value includes transmit by the RIC to the network entity one or more new paging configuration parameter values based on the determined at least one of the first paging stage timeout value, the second paging stage timeout value and the paging cache timeout value.

15. A non-transitory computer-readable medium comprising instructions for improving paging in a radio network, which, when executed, cause a Radio Access Network (RAN) Intelligent Controller (RIC) of the radio network to perform steps comprising:

collecting data from at least one of one or more OpenRAN (ORAN) centralized units (CUs) of the radio network and one or more ORAN distributed units (DUs) of the radio network;

determining at least one of a first paging stage timeout value, a second paging stage timeout value, and a paging cache timeout value based on the collected data; and causing adjusting by a network entity coupled to the RIC of one or more paging configuration parameter values based on the determined at least one of the first paging stage timeout value, the second paging stage timeout value and the paging cache timeout value.

16. The non-transitory computer-readable medium of claim 15, wherein determining a paging cache timeout value includes determining the paging cache timeout value based on one or more of a mobility of a subscriber, a Global Unique Temporary Identifier (GUTI) changing frequency for the subscriber triggered by core network, a paging cache hit frequency, and a time of day based on a subscriber pattern.

17. The non-transitory computer-readable medium of claim 15, wherein determining a first paging stage timeout value includes determining the first paging stage timeout value based on at least one of how congested the radio network is, and whether, during a paging process, a paging response from a same subscriber from a same location is received after the paging process already moved to a second paging stage.

18. The non-transitory computer-readable medium of claim 15, wherein determining a second paging stage timeout value includes determining the second paging stage timeout value based on at least one of paging retransmissions from the network entity for a same subscriber during the second paging stage and how many times a subscriber responds to paging after timer expiry for the second paging stage.

19. The non-transitory computer-readable medium of claim 15, wherein:

collecting data by a RIC includes at least one of collecting near-real time data by a near-real time RIC and collecting non-real time data by a non-real time RIC; and determining at least one of a first paging stage timeout value, a second paging stage timeout value, and a paging cache timeout value based on the collected data includes determining, by at least one of an xApp and an rApp of the RIC, at least one of the first paging stage timeout value, the second paging stage timeout value, and the paging cache timeout value based on the collected data.

20. The non-transitory computer-readable medium of claim 15, wherein causing adjusting by a network entity coupled to the RIC of one or more paging configuration parameter values based on the determined at least one of the first paging stage timeout value, the second paging stage timeout value and the paging cache timeout value includes transmitting by the RIC to the network entity one or more new paging configuration parameter values based on the determined at least one of the first paging stage timeout value, the second paging stage timeout value and the paging cache timeout value.

* * * * *